(12) United States Patent
Aytur et al.

(10) Patent No.: US 7,822,156 B2
(45) Date of Patent: Oct. 26, 2010

(54) CHANNEL ESTIMATION

(75) Inventors: Turgut Aytur, Plattsburgh, NY (US);
Stephan ten Brink, Irvine, CA (US);
Ravishankar H. Mahadevappa, Irvine,
CA (US); Ran Yan, Holmdel, NJ (US)

(73) Assignee: Realtek Semiconductor Corp, Hsinchu
(TW)

( * ) Notice: Subject to any disclaimer, the term of this patent is extended or adjusted under 35 U.S.C. 154(b) by 683 days.

(21) Appl. No.: 11/757,247

(22) Filed: Jun. 1, 2007

(65) Prior Publication Data

US 2007/0280366 A1 Dec. 6, 2007

Related U.S. Application Data

(60) Provisional application No. 60/810,352, filed on Jun. 1, 2006.

(51) Int. Cl.
*H04B 1/10* (2006.01)
*H04L 27/06* (2006.01)
(52) U.S. Cl. ........................... 375/350; 375/342
(58) Field of Classification Search .............. 375/260, 375/267, 285, 295, 316, 341–342, 346–347, 375/350; 370/208, 210, 503, 512
See application file for complete search history.

(56) References Cited

U.S. PATENT DOCUMENTS

| 6,654,429 | B1 * | 11/2003 | Li ........................... 375/316 |
| 6,771,591 | B1 | 8/2004 | Belotserkovsky et al. |
| 6,985,432 | B1 | 1/2006 | Hadad |
| 7,292,651 | B2 * | 11/2007 | Li ........................... 375/316 |
| 7,339,999 | B2 * | 3/2008 | Gore et al. .................. 375/260 |
| 7,457,231 | B2 * | 11/2008 | Vijayan et al. .............. 370/208 |
| 2003/0058787 | A1 * | 3/2003 | Vandenameele-Lepla ... 370/206 |
| 2004/0081131 | A1 | 4/2004 | Walton et al. |
| 2006/0072524 | A1 | 4/2006 | Perahia et al. |

OTHER PUBLICATIONS

International Search Report completed Nov. 26, 2007 and mailed Feb. 4, 2008 from corresponding International Application No. PCT/US07/70276 (2 pgs).
Written Opinion of the International Searching Authority completed Nov. 26, 2007 and mailed Feb. 4, 2008 from corresponding International Application No. PCT/US07/70276 (4 pgs).

* cited by examiner

*Primary Examiner*—Khanh C Tran
(74) *Attorney, Agent, or Firm*—Thomas, Kayden, Horstemeyer & Risley

(57) ABSTRACT

A receiver including a channel estimation function in which an initial channel estimate is filtered to increase receiver operation, particularly when the receiver may only have a limited number of channel estimation symbols with which to form the channel estimate. In some embodiments the filtering is performed by transforming the initial channel estimate to the time domain, zeroing some of the samples to filter the time domain channel estimate, and transforming the filtered time domain channel estimate to the frequency domain for use in channel compensation.

17 Claims, 9 Drawing Sheets

CHANNEL ESTIMATION

CROSS-REFERENCE TO RELATED APPLICATION(S)

This application claims the benefit of U.S. Provisional Patent Application No. 60/810,352, filed Jun. 1, 2006, the entire contents of which are incorporated herein by reference.

BACKGROUND OF INVENTION

The present invention relates generally to receivers, more particularly to channel estimation and compensation in a receiver.

Receivers receive information over communication channels. Communication channels generally serve to allow propagation of data over space or time. Communication channels may be varied. Copper pairs, optical fiber, and wireless communication channels are commonly used as communication channels, although at times any medium may serve as a communication channel.

Preferably the receiver provides received data to subsequent data usage systems with content of the data unchanged by the transmission/reception process. Unfortunately, due to introduction of noise, information received by the receiver may differ from information transmitted, or intended to be transmitted, by the transmitter. Noise may come from a number of sources, including noise associated with the channel over which the data is transmitted. Often, the noise introduced by the channel includes noise of a non-random nature. Accordingly, knowledge of the effect of the communication channel on the received data may therefore be used to adjust the received signal to account for the non-random noise of the channel.

Many communication systems perform a channel estimation process in the receiver so as to estimate the effect of the communication channel on received information. This channel estimate may thereafter be applied to a received signal to at least partially remove noise introduced by the channel. The channel estimate is often determined as an average over many received symbols as each individual symbol may also impacted by random noise in the channel, which may vary from symbol to symbol.

Unfortunately, in some systems only a limited number of received symbols of information are available for use in determining channel estimates, and the limited number of symbols may be insufficient to provide a channel estimate sufficient to avoid receiver degradation.

SUMMARY OF THE INVENTION

The invention provides filtered channel estimates. In some embodiments the invention forms an initial channel estimate, for example using conventional methods, then transforms the initial to the time domain, filters the time domain initial channel estimate, and transforms the filtered time domain channel estimate back to the frequency domain.

In one aspect the invention provides a method of performing channel estimation by a receiver, comprising determining a frequency domain initial channel estimate; transforming the frequency domain initial channel estimate to the time domain; filtering the time domain initial channel estimate; and transforming the filtered time domain initial channel estimate to the frequency domain.

In one aspect the invention provides a receiver for a wireless communication system, comprising downconversion circuitry to downconvert received signals to baseband; an analog to digital converter to digitize the baseband signals; a Fast Fourier Transform (FFT) block to transform the digitized signal to the frequency domain; and a channel estimate block to provide a channel estimate for use in performing channel compensation on the frequency domain signal, the channel estimate block including circuitry to form an initial channel estimate, an inverse Fast Fourier Transform (iFFT) block to transform the initial channel estimate to the time domain, a filter implementing a digital mask to mask selected samples of the fine domain initial channel estimate, and a further FFT block to transform the masked time domain initial channel estimate to the frequency domain.

In another aspect the invention provides A system for forming channel estimates in a receiver, comprising an initial channel estimate block for forming an initial channel estimate; an inverse Fast Fourier Transform (iFFT) block for transforming the initial channel estimate to the time domain; a filter for filtering the time domain initial channel estimate; and a Fast Fourier Transform (FFT) block for transforming the filtered time domain initial channel estimate to the frequency domain.

These and other aspects of the invention are more fully comprehended upon review of this disclosure.

DETAILED DESCRIPTION

Figure 1:
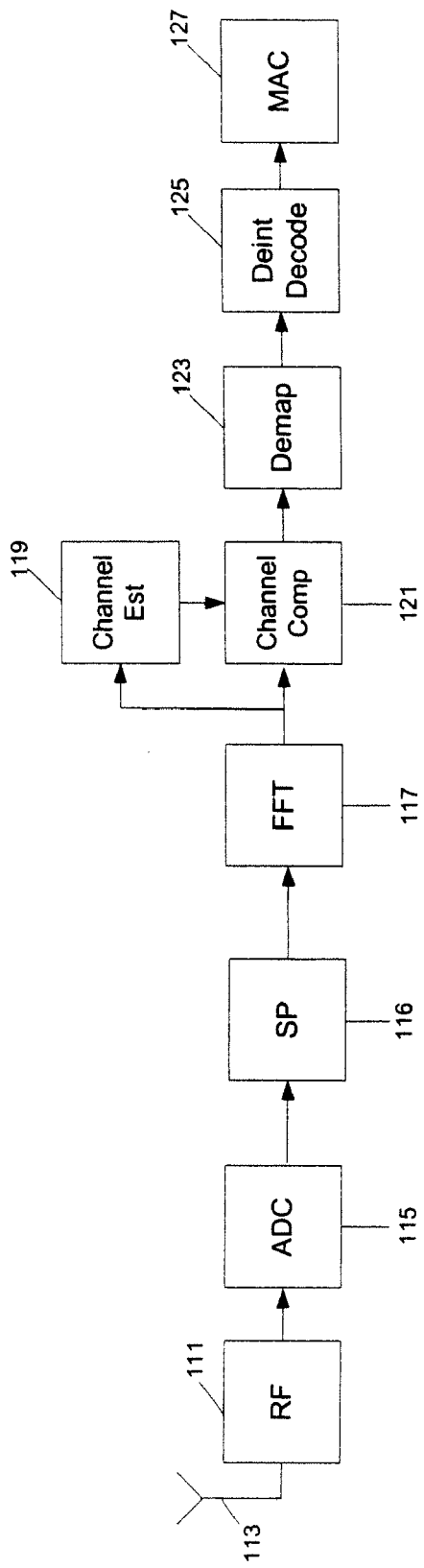
FIG. 1 is a block diagram of a receiver in accordance with aspects of the invention.

FIG. 1 is a block diagram of a receiver in accordance with aspects of the invention. An RF block 111 is configured to receive signals by way of an antenna 113. The RF block usually includes a low noise amplifier (LNA) to amplify received signals and one or more mixers. The mixers downconvert the amplified received signal, generally to baseband, although in some embodiments the signal may first be downconverted to an intermediate frequency prior to further downconversion to baseband. Generally the RF block will also include a chain of amplifiers, often referred to as post amplifiers, as well as also possibly other circuitry such as automatic game control (AGC) circuitry.

An analog to digital converter (ADC) 115 receives signals provided by the RF block. The ADC digitizes the signal. A fast Fourier transform (FFT) block 117 transforms the digital signal to the frequency domain. In many embodiments various signal processing circuitry, represented in FIG. 1 as a signal processing (SP) block 116, may be found between the ADC block and the FFT block in the data processing chain. The SP block may include circuitry, for example, for performing packet detection, packet synchronization, and possibly other functions.

The frequency domain signals are received by a channel estimation block 119 and a channel compensation block 121. The channel estimation block estimates channel effects on received signals and is configured to provide a channel estimate to the channel compensation block. In most embodiments the channel estimation block determines an initial channel estimate, and filters the initial channel estimate to determine a channel estimate for use by the channel compensation block. The channel compensation block is configured to compensate for channel effects using the channel estimate.

The channel compensated signals are received by a demapper 173. The demapper generally demaps the received signal from a constellation or a QPSK or DPSK scheme. The demapped data is received by a deinterleaver and decoder block 175, which may be separately implemented, but are shown as a single block in FIG. 1. The deinterleaver and decoder deinterleave and decode the demapped data with, for example, the decoder implemented as a Viterbi decoder. The deinterleaved and decoded data is received by a media access controller (MAC) 127, which although not generally considered part of a receiver is nevertheless shown to illustrate a data sink.

Figure 2:
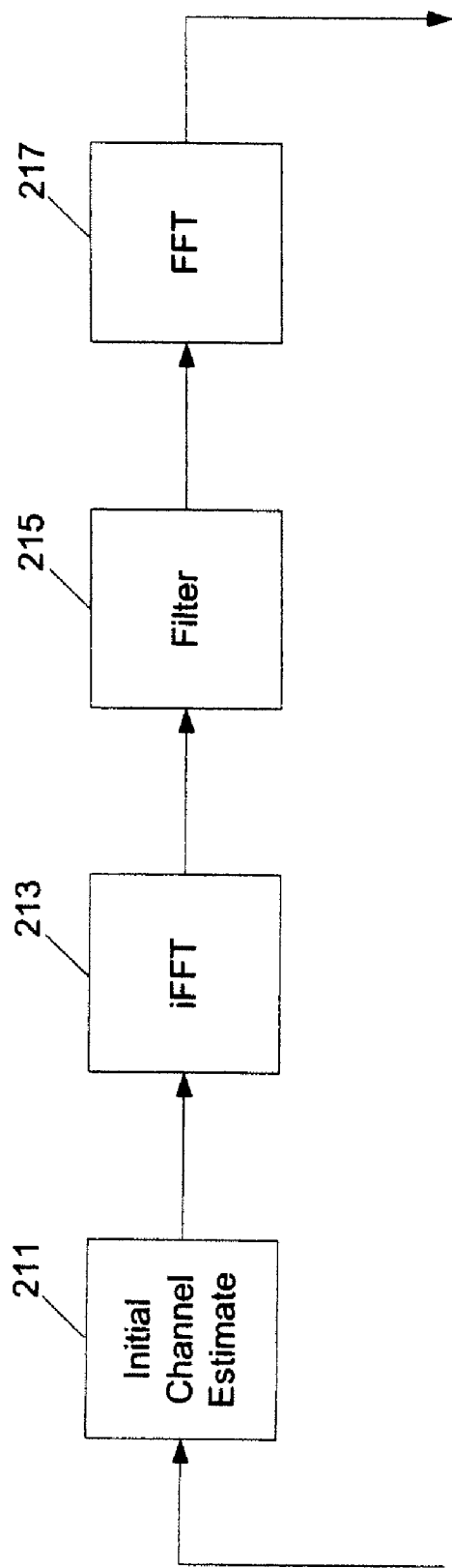
FIG. 2 is a block diagram of a channel estimation block in accordance with aspects of the invention.

FIG. 2 is a block diagram of a channel estimation block in accordance with aspects of the invention. The channel estimation block includes an initial channel estimation block 211. The initial channel estimation block 211 receives a frequency domain signal, preferably a symbol of a known expected bit pattern, which may be termed a training symbol. The initial channel estimation block includes circuitry for estimating a channel coefficient. In many embodiments the circuitry for estimating channel coefficients is circuitry as known in the art for performing such operations. In most embodiments the circuitry includes circuitry for multiplying a received symbol with the complex conjugate of an expected symbol. For example, a received signal may be described as y=hs+n, with y a received symbol, h a complex channel coefficient, s a transmittal symbol (such as a QAM symbol), and n being additive Gaussian noise. The channel coefficient h may therefore be estimated as $h=ys^*/|s|^2$, where $s^*$ is the complex conjugate of the transmitted symbol, usually a known training symbol of a channel estimation sequence of symbols An inverse fast Fourier transform (iFFT) block 213 receives this channel estimate, which is an initial channel estimate. The iFFT block transforms the initial channel estimate to the time domain. A filter 215 receives the time domain initial channel estimate and filters the time domain channel estimate. An FFT block 217 transforms the filtered time domain channel estimate to the frequency domain.

The time domain initial channel estimate may be filtered using a number of filtering schemes. In most embodiments a low pass filtering scheme is used, although in other embodiments a band pass or a high pass filtering scheme may be employed. In many embodiments a mask is applied to samples of the time domain initial channel estimate. The mask, for example, may provide for reduction in magnitude of predetermined samples of the time samples, and in many embodiments provide for zeroing the predetermined samples of the times samples.

Figure 3:
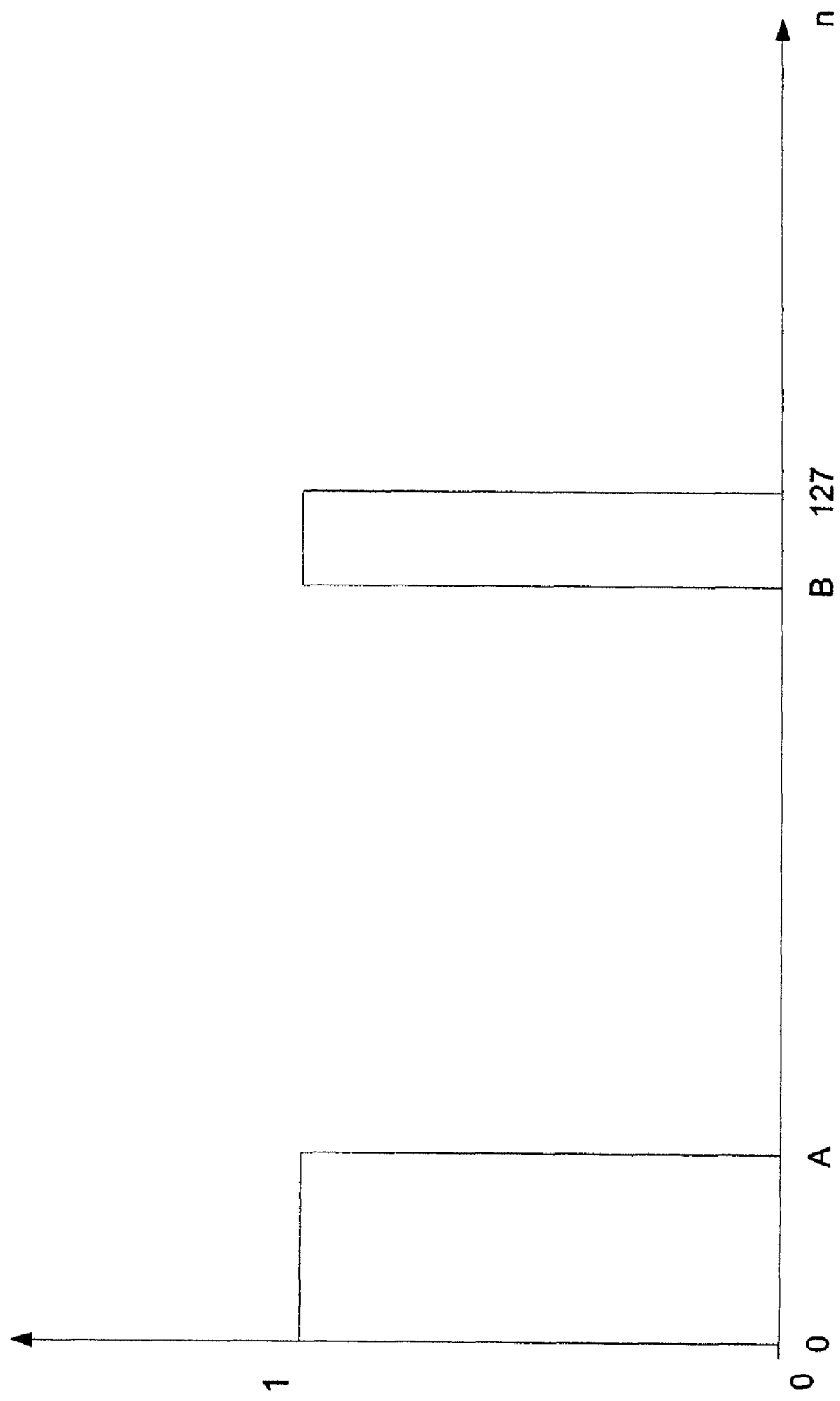
FIG. 3 is a chart showing an example filter masking function in accordance with aspects of the invention.

In some embodiments filtering the initial channel estimate is performed in accordance with the chart of FIG. 3, which shows an example mask pattern. The chart of FIG. 3 uses as an example an output symbol of an iFFT block with 128 samples. As shown in FIG. 3, the mask zeros all but the first A samples of the symbol and the last B samples of the symbol.

In some embodiments the number of samples of a symbol mask at the beginning of the symbol is set to a constant, and the number of samples at the end of the symbol to be masked is also set to a constant. In some embodiments the number of samples at the beginning and the number of samples at the end of the symbol to be masked are read from external registers, for example, as set by a MAC. In some embodiments the mask position is determined by obtaining a sample number, or index, of the sample having the maximum peak value of all the samples in a symbol, and setting samples a pre-selected distance away from the sample having the peak value to zero. In some embodiments all samples for which averages of the channel samples response fall below a threshold are set to zero.

Figure 4:
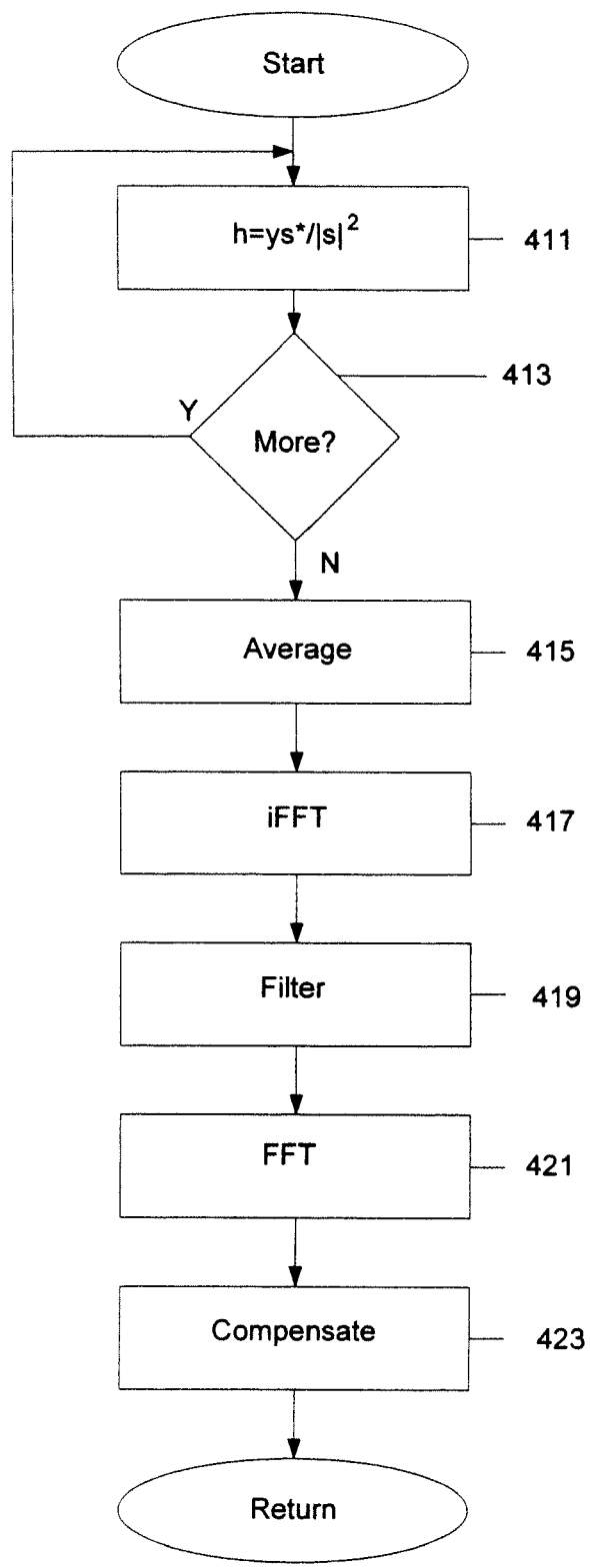
FIG. 4 is a flow diagram of a process for performing channel compensation using a filtered channel estimate in accordance with aspects of the invention.

FIG. 4 is a flow diagram of a process in accordance with aspects of the invention. In block 411 the process multiplies a received symbol with the complex conjugate of an expected known training symbol in the frequency domain. In most cases the magnitude of the multiplication is also scaled, through division for example, by the square of the magnitude of expected known training symbol in order to properly scale the channel estimate. In block 413 the process determines if multiplication has been performed for a sufficient number of symbols. If not, then the process returns to block 411 and performs multiplication for a further received symbol.

If, in block 413, the process determines that a sufficient number of multiplications have been performed, the process determines an average of the results of the multiplication. The average forms an initial channel estimate.

In block 417 the process transforms the initial channel estimate into the time domain, forming what may be considered a time domain impulse response of the channel. Preferably this is accomplished using an inverse Fast Fourier Transform. In many embodiments the iFFT is performed in a manner based on manner in which the symbol was transformed into the frequency domain by another FFT block in a receiver. Thus, in many embodiments, if the FFT is performed using a decimation in time, then the iFFT is performed using a decimation in frequency. Conversely, if the FFT is performed using a decimation in frequency, the iFFT is performed using a decimation in time. In many such embodiments, bit reordering of the FFT or iFFT output when using decimation in frequency, or bit reordering of the input when using decimation in time, is not performed. This allows increased system throughput, as the time or space required for performing such operations need not be taken, or at least not undertaken until performance of channel compensation or afterwards.

In block 419 the process filters the time domain impulse response. In some embodiments the filtering is accomplished by setting certain of the samples to zero. For example, in one embodiment all but the first eight samples of a symbol and the last 24 samples of the symbol are set to zero. In some embodiments all but eight of the samples prior to a peak magnitude sample are set to zero, and all but 24 samples after the peak magnitude sample are set to zero.

In block 421 the process transforms the filtered time domain impulse to the frequency domain. Preferably this is accomplished using an FFT. As with the iFFT, in many embodiments if the iFFT is performed using a decimation in time, then the FFT is performed using a decimation in frequency. Conversely, if the iFFT is performed using a decimation in frequency, the FFT is performed using a decimation in time. Again, in many embodiments, bit reordering is not performed.

In block 423 the process compensates for channel effects by applying the channel estimate to received symbols.

Figure 5:
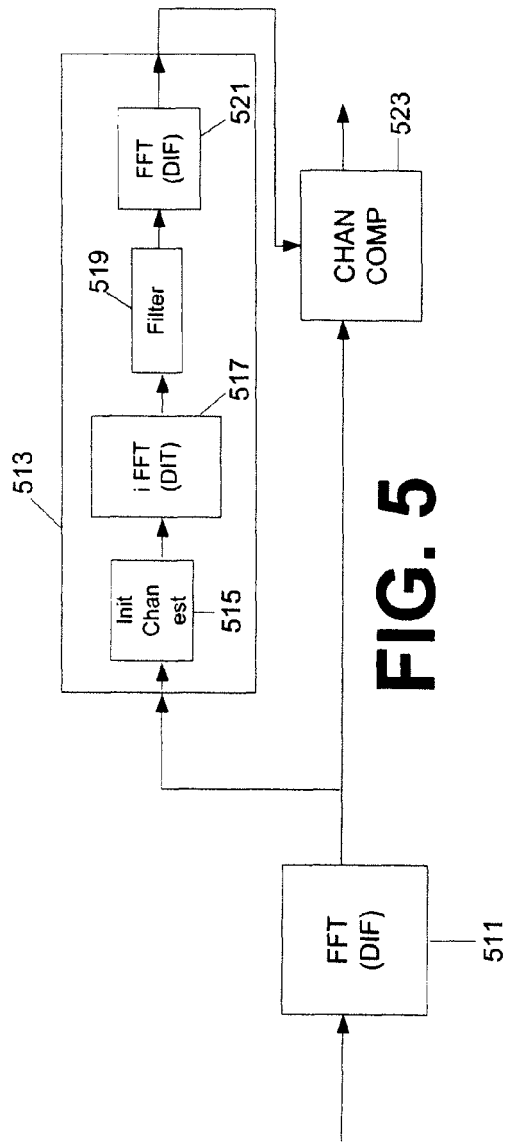
FIG. 5 is a block diagram of portions of a receiver including matched FFT/iFFT/FFT blocks for reducing latency.

FIG. 5 illustrates portions of a receiver with reduced latency channel estimate filtering. An FFT block 511 receives symbols in the time domain and transforms the symbols to the frequency domain. As illustrated, the FFT block 511 uses a decimation in frequency method for performing the transform, preferably a radix-2 method, implemented by circuitry. The FFT block 511 does not perform bit reordering, so the output of the FFT block is bit reversed in view of the use of the decimation in frequency method.

The frequency domain symbols are received by a channel estimation block 513. The channel estimation block includes an initial channel estimation block 515, an iFFT block 517, a filter block 519, and an FFT block 521 (for convenience sometimes referred to as a CH-FFT block), as generally described with respect to FIG. 2. The initial channel estimation block receives the frequency domain symbols and forms an initial channel estimate, for example as discussed with respect to FIG. 2.

The iFFT block receives output of the initial channel estimation block and includes circuitry for performing the iFFT using a decimation in time method. The decimation in time method uses a bit reversed input and provides a non bit-reversed output, with the input bit reversal usually accomplished prior to input to the decimation in time circuitry. As the FFT block uses decimation in frequency and does not perform bit reordering, however, the iFFT block using decimation in time may directly operate on output of the initial channel estimation block without first performing bit reordering, thereby decreasing latency of system operation.

The filter block receives the output of the iFFT block and includes circuitry for performing a filtering function on the output of the iFFT block, which is a time domain representation of the initial channel estimate, and which can be considered a time domain impulse response of the channel. The filter block filters the initial channel estimate, for example as discussed with respect to the other figures.

The CH-FFT block receives the filtered time domain channel estimate, and includes circuitry for performing an FFT. In the embodiment of FIG. 5 the CH-FFT block includes circuitry for performing a decimation in frequency method, preferably a radix-2 method, which as previously discussed operates on a non-bit reversed input and provides a bit reversed output. Accordingly, the output of the CH-FFT block has the same bit order as the output of the FFT block of the receiver.

Figure 6:
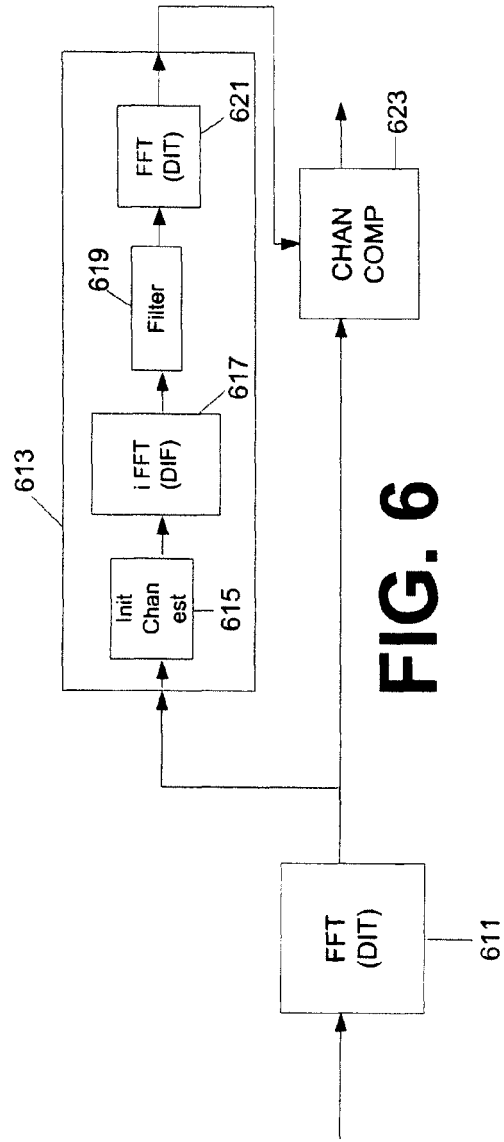
FIG. 6 is a further block diagram of portions of a receiver including match FFT/iFFT/FFT blocks for reducing latency.

FIG. 6 illustrates portions of a further receiver with reduced latency channel estimate filtering. The portion of the receiver of FIG. 6 are similar to the portions of the receiver of FIG. 5, but while the receiver of FIG. 5 included transform operations in a sequence of decimation in frequency, decimation in time, and decimation in frequency, the receiver of FIG. 6 includes transform operation in the sequence of decimation in time, decimation in frequency, and decimation in time.

Accordingly, in FIG. 6, an FFT block 611 receives symbols in the time domain and transforms the symbols to the frequency domain. As illustrated, the FFT block 611 uses a decimation in time method for performing the transform, preferably a radix-2 method implemented by circuitry. The FFT block 611 perform bit reordering for input to the FFT block, so the output of the FFT block is non-bit reversed.

The frequency domain symbols are received by a channel estimation block 613. The channel estimation block includes an initial channel estimation block 615, an iFFT block 617, a filter block 619, and an FFT block 621 (again for convenience sometimes referred to as a CH-FFT block), as generally described with respect to FIG. 2. The initial channel estimation block receives the frequency domain symbols and forms an initial channel estimate, for example as discussed with respect to FIG. 2.

The iFFT block receives output of the initial channel estimation block and includes circuitry for performing the iFFT using a decimation in frequency method. The iFFT block 617, however, does not perform bit reordering of its output, thereby decreasing latency of system operation.

The filter block receives the output of the iFFT block and includes circuitry for performing a filtering function on the output of the iFFT block, which is a time domain representation of the initial channel estimate, and which can be considered a time domain impulse response of the channel. The filter block filters the initial channel estimate, for example as discussed with respect to the other figures. As the filter block receives the output of the iFFT block 617, the filter block receives a bit reversed version of the time domain initial channel estimate and operates on the bit reversed version.

The CH-FFT block receives the filtered time domain channel estimate, and includes circuitry for performing an FFT. In the embodiment of FIG. 6 the CH-FFT block includes circuitry for performing a decimation in time method, preferably a radix-2 method, which as previously discussed operates on a bit reversed input and provides a non-bit reversed output. Accordingly, the output of the CH-FFT block has the same bit order as the output of the FFT block of the receiver.

Figure 7:
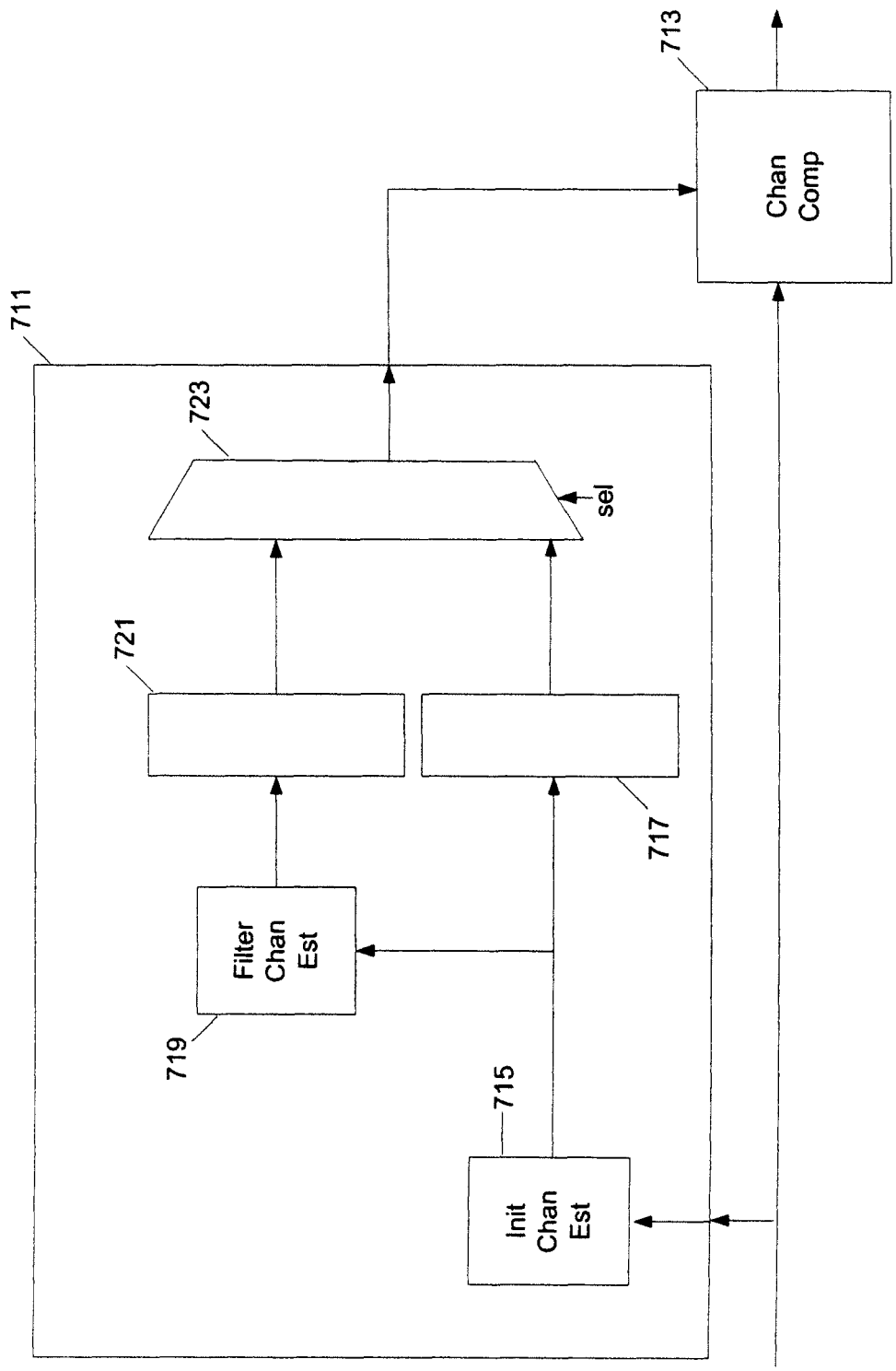
FIG. 7 is a block diagram of a further channel estimation block of a receiver in accordance with aspects of the invention.

FIG. 7 is a block diagram of a further embodiment of portions of a receiver in accordance with aspects of the invention. FIG. 7 shows a channel estimation block 711 and a channel compensation block 713. Both the channel estimation block and the channel compensation block receive frequency domain representations of received symbols. The channel estimation block provides a channel estimate, generally in the form of channel coefficients, to the channel compensation block. The channel compensation block uses the channel coefficients to compensate for channel effects, generally by derotating the frequency domain representations of received symbols.

Within the channel estimation block, an initial channel estimation block receives the frequency domain representations of received symbols. The initial channel estimation block includes circuitry for generating an initial channel estimate, for example as previously discussed. The initial channel estimate is received by a memory 717 and a filter channel estimate block. The filter channel estimate block includes iFFT circuitry, filter circuitry, and FFT circuitry to transform the initial channel estimate to the time domain, filter the time domain initial channel estimate, and transform the time domain filtered initial channel estimate to the frequency domain. The filtered channel estimate is received by a memory 721. Contents of the memory 717 and contents of the memory 721 are provided as inputs to a multiplexer 723. A selector signal is used to select either the contents of the memory 717 or the contents of the memory 721 as an output of the multiplexer. The output of the multiplexer is received by the channel compensation block as the channel estimate for use in performing channel compensation.

In many embodiments the contents of the memory 717, namely the initial channel estimate, are used for performing channel compensation until the filtered channel estimate is available. For example, the filtered channel estimate is formed using the initial channel estimate, so the initial channel estimate is available prior to the availability of the filtered channel estimate. In many embodiments a latency time is known for generation of the filtered channel estimate, and that time, plus potentially an additional time to ensure completion of filtering, is used in control of the selector signal.

Figure 8:
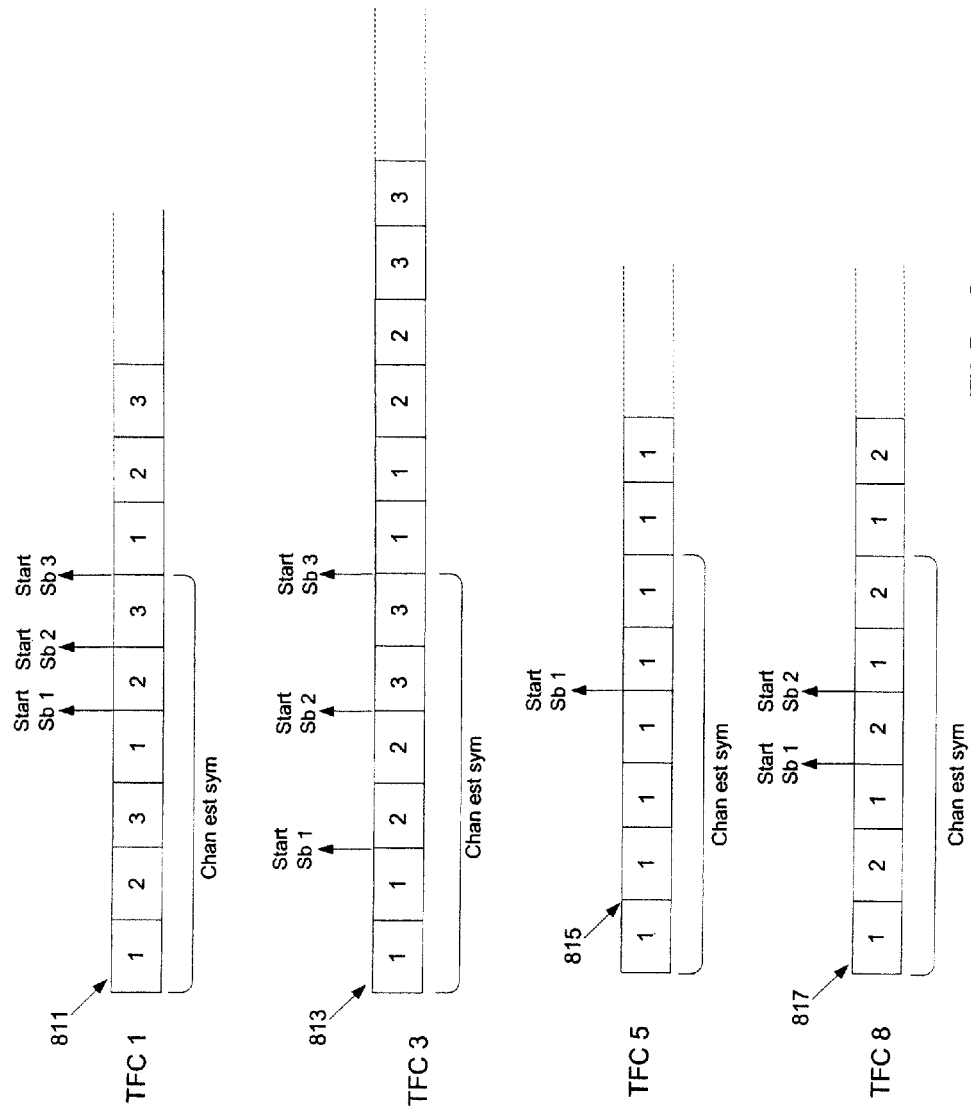
FIG. 8 is a chart showing time relationship of operations on symbols in a time frequency hopping communication system in accordance with aspects of the invention.

FIG. 8 illustrates various time frequency code (TFC) patterns for a communication system employing frequency hopping, for example in an OFDM ultrawideband (UWB) communication system. A first hopping pattern for TFC 1 811 shows that a first OFDM symbol is received on a subband 1 during a first symbol period, followed by a second OFDM symbol received on a subband 2 during a second symbol period, followed by a third OFDM symbol received on a subband 3 during a third symbol period, and so on with the use of subbands hopping in the same manner for subsequent OFDM symbols.

A TFC 2 (not shown) includes a similar frequency hopping pattern, but with the subband usage being in the order of subband 1, subband 3, subband 2, which thereafter repeats. It should be understood that other frequency hopping patterns can be derived using the three subbands in a different order. A TFC 3 813 is shown in which a frequency hopping pattern is in the order of subband 1, subband 1, subband 2, subband 2, subband 3, subband 3, and so on. Similar frequency hopping patterns may also be used. A TFC 5 815 is shown in which no frequency hopping occurs, with each symbol received on a single subband. TFCs 6 and 7 (not shown) may be similar, but using other frequency subbands. A TFC 8 817 is also shown, with a frequency hopping pattern of subband 1, subband 2, subband 1, subband 2, and so on.

In one UWB system a packet includes a packet synchronization sequence of 12 or 24 (depending on whether the packet includes a short or long preamble) OFDM symbols, followed by a channel estimation sequence of 6 OFDM symbols, followed by a header of 12 OFDM symbols, followed in turn by a payload of data of a number of OFDM symbols. Accordingly, in FIG. 8 the channel estimation sequence symbols are identified for each of the TFCs shown.

Generally the channel estimation symbols are used for channel estimation, and channel estimates should be ready for use in compensating for channel effects for the first symbol of the preamble. Unfortunately, channel effects may differ for different subbands, so preferably channel estimates are determined for each subband.

In some embodiments channel estimates are determined as described herein, for example by time domain filtering of an initial channel estimate, and determining the filtered channel estimates requires up to two symbol periods. It is believed, however, that filtered channel estimates determined using an initial channel estimate based on two received symbols is sufficient for use in channel compensation, without undue receiver degradation. Accordingly, in embodiments of the invention, particularly those with FFT/iFFT/CH-FFT matching structures such as described with respect to FIGS. 5 and 6, a filtered channel estimate is determined using an initial channel estimate based on two received symbols. Thus, as shown in FIG. 8, for TFC 1, a start of iFFT/filter/FFT processing for subband 1 begins after receiving a second symbol on subband 1, and similar processing for subbands 2 and 3 begin after receiving a second symbol for those subbands. Beginning the processing after receiving the second symbol allows for completion of the filtering process and availability of a filtered channel estimate prior to receipt of the first header symbol on that subband. Similar considerations apply to the start of the filtering process for TFC 3, for example.

With respect to the examples of TFCs 5 and 8, start of the filtering process for a subband begins prior to receipt of all channel estimation symbols for the subband. This allows for availability of the filtered channel estimate prior to receipt of the first header symbol.

Figure 9:
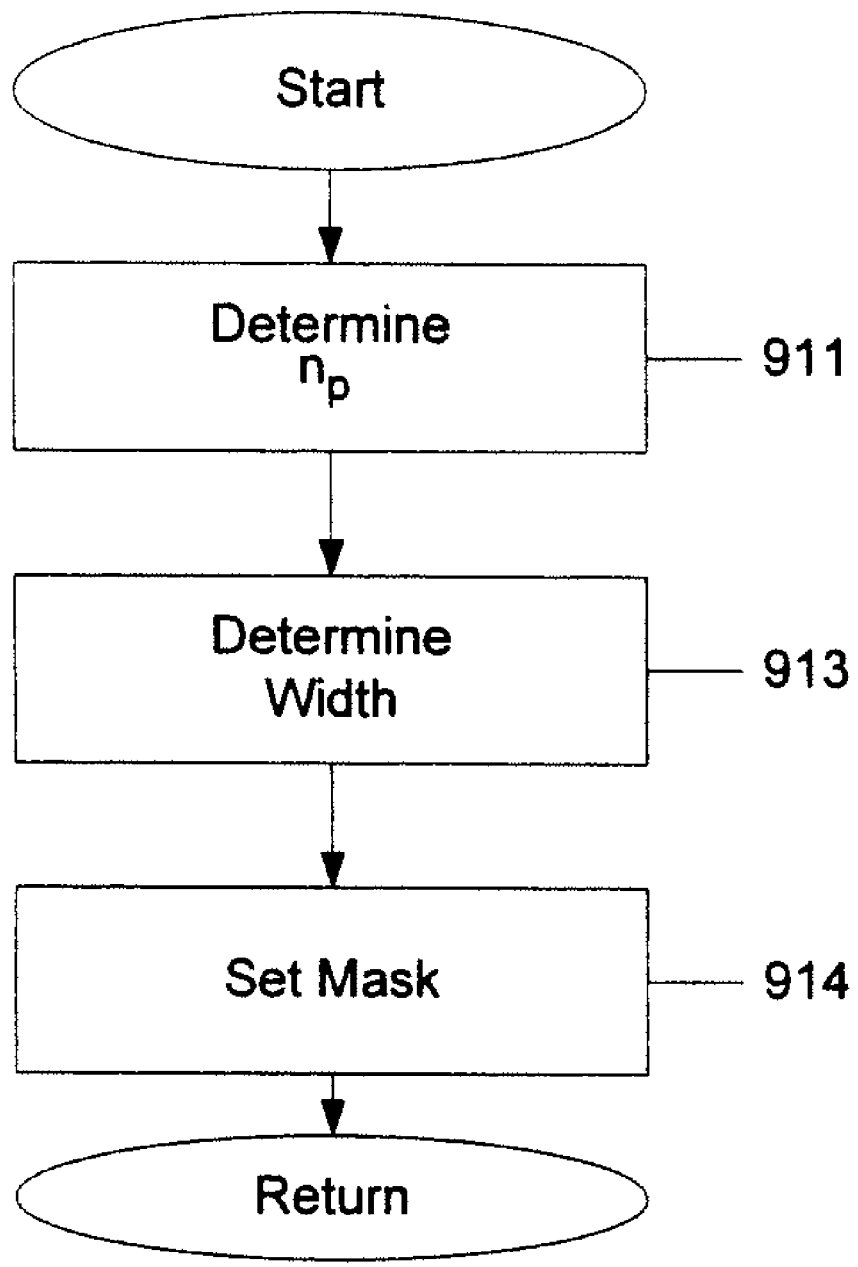
FIG. 9 is a flow diagram of a process of determining a filter mask in accordance with aspects of the invention.

FIG. 9 is a flow diagram of a process for determining a mask for a filter function, such as for the filters discussed herein. In some embodiments the mask sets selected time samples to zero, or masks those time samples. In some embodiments the mask has a constant mask position and a constant mask width, for example as shown in the sample mask of FIG. 3 with A and B a constant. More commonly, however, the A and B positions of a mask such as that of FIG. 3 is set by external registers, the values of which may be determined by a MAC associated with the receiver.

In some embodiments the mask is set based on a position of a sample having a peak magnitude, for example as may correspond to a strongest receive path over a multipath channel. In block 911 of FIG. 9 the process determines an index or position, denoted $n_p$, of a sample of a symbol having the greatest values. In block 913 the process determines a mask width. For example, in some embodiments the mask width is a constant number of samples, such as 32 samples. In some embodiments, however, the mask width may vary based on characteristics of the samples. For example, in some embodiments an average of samples over a window is determined, and the mask edges are set to where the average transitions from a value above a threshold to a value below a threshold. The threshold may be set by a register, or may be set by a value in a register multiplied by the peak magnitude, or alternatively, by determining when the average divided or normalized by the peak magnitude falls below a threshold.

In block 914 the process sets the mask values. The mask is thereafter used to filter the time domain channel impulse response, as previously discussed.

Figure 10:
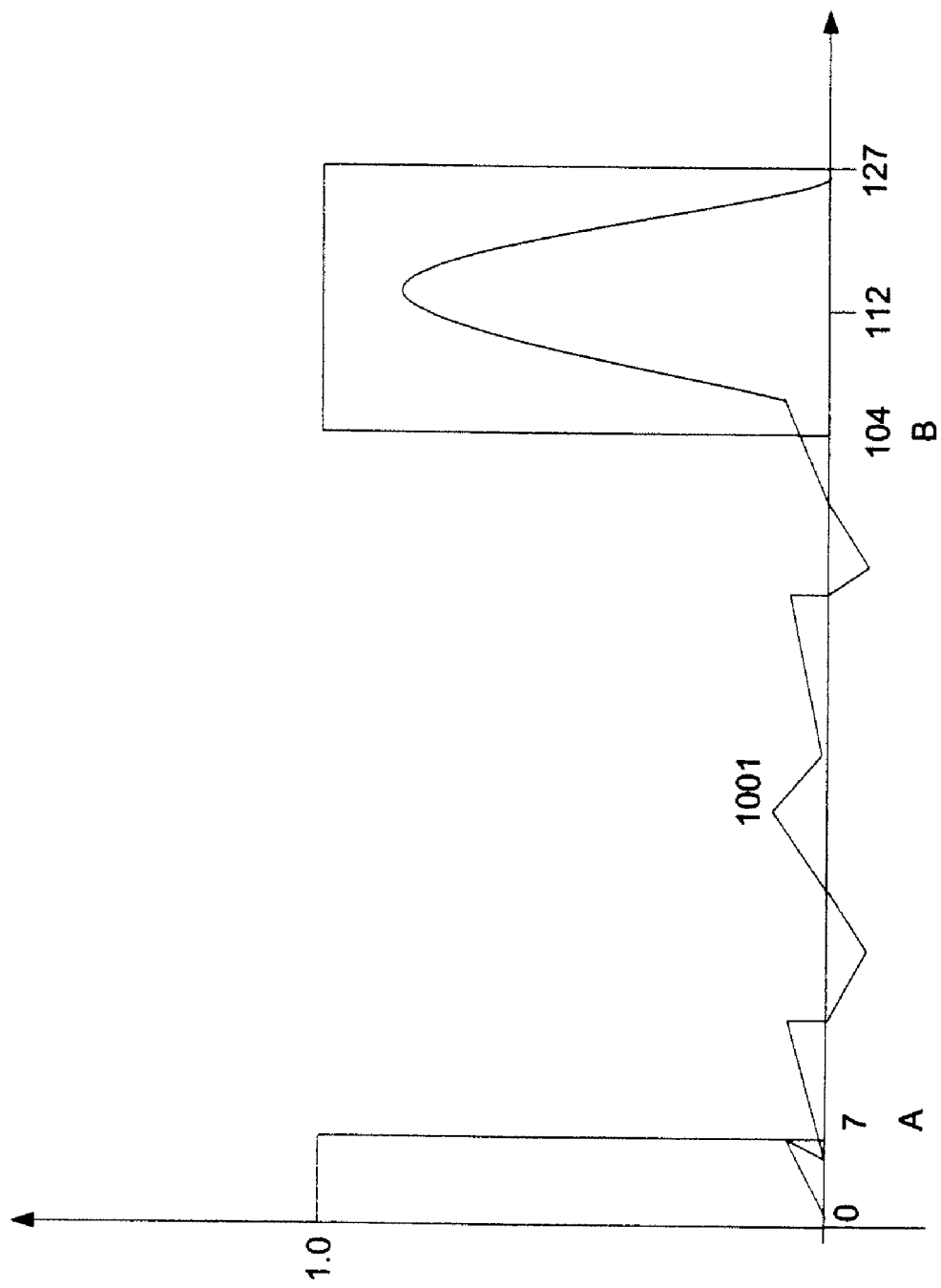
FIG. 10 is a chart showing a filter mask and sample values.

FIG. 10 graphically illustrates a mask for the filter, in accordance with aspects of the invention. FIG. 10 shows magnitudes of values 1001 of samples. As illustrated, the chart shows 128 samples, with an index ranging from 0 to 127. The samples have a peak magnitude at approximately index 112. All but 32 of the samples are masked, set to zero in this case. The 32 non-masked samples range from index 104 to index 7, with 8 samples non-masked before the peak magnitude sample and 24 samples non-masked after the peak magnitude sample. It should also be noted that in the chart of FIG. 10, the index ranges from 0 to 127, corresponding to time a time index of −64 to 63, with index values 64 to 127 corresponding to the time index of −64 to −1.

Accordingly, a filtering of a channel impulse response for forming a filtered channel estimate is disclosed. Although the invention has been described with respect to certain aspects and embodiments, it should be recognized that the invention may be practiced other than as specifically discussed, and the invention comprises the claims and their insubstantial variations supported by this disclosure.

What is claimed is:

1. A method of performing channel estimation by a receiver, comprising:
   determining a frequency domain initial channel estimate;
   transforming the frequency domain initial channel estimate to the time domain;
   filtering the time domain initial channel estimate, wherein the filtering comprises one operation from the group consisting of: setting to zero selected samples of the time domain initial channel estimate, and masking selected samples by using a digital filter mask; and
   transforming the filtered time domain initial channel estimate to the frequency domain.

2. The method of claim 1 wherein determining a frequency domain initial channel estimate comprises:
- multiplying a frequency domain representation of a symbol representing a received signal with a predetermined training symbol; and
- averaging results of the multiplying over a plurality of symbols.

3. The method of claim 1 wherein filtering the time domain initial channel estimate comprises setting selected ones of samples of the time domain initial channel estimate to zero.

4. The method of claim 1 wherein the mask indicates that samples with an index of greater than an index value A and less than an index value B are to be set to zero.

5. The method of claim 4 wherein the index value A and the index value B are a constant.

6. The method of claim 4 wherein the index value A and the index value B are determined based on an index of a sample having a peak magnitude of the samples.

7. The method of claim 4 wherein the index value A and the index value B are determined based on an index of a sample having a peak magnitude of the samples and values of the samples other than the sample having a peak magnitude of the samples.

8. The method of claim 1 wherein the determining a frequency domain initial channel estimate, transforming the frequency domain initial channel estimate to the time domain, filtering the time domain initial channel estimate, and transforming the filtered time domain initial channel estimate to the frequency domain is performed separately for signals received over a plurality of subbands.

9. A method of performing channel estimation by a receiver, comprising:
- determining a frequency domain initial channel estimate;
- transforming the frequency domain initial channel estimate to the time domain;
- filtering the time domain initial channel estimate; and
- transforming the filtered time domain initial channel estimate to the frequency domain;
- wherein the initial channel estimate is in bit reversed order and transforming the frequency domain initial channel estimate to the time domain is performed using a decimation in time method without bit reversal of inputs and transforming the filtered time domain initial channel estimate to the frequency domain is performed using a decimation in frequency method without bit reversal of outputs.

10. A method of performing channel estimation by a receiver, comprising:
- determining a frequency domain initial channel estimate;
- transforming the frequency domain initial channel estimate to the time domain;
- filtering the time domain initial channel estimate; and
- transforming the filtered time domain initial channel estimate to the frequency domain;
- wherein the initial channel estimate is in non-bit reversed order and transforming the frequency domain initial channel estimate to the time domain is performed using a decimation in frequency method without bit reversal of outputs and transforming the filtered time domain initial channel estimate to the frequency domain is performed using a decimation in time method without bit reversal of inputs.

11. A system for forming channel estimates in a receiver, comprising:
- an initial channel estimate block for forming an initial channel estimate;
- a inverse Fast Fourier Transform (iFFT) block for transforming the initial channel estimate to the time domain;
- a filter for filtering the time domain initial channel estimate;
- a Fast Fourier Transform (FFT) block for transforming the filtered time domain initial channel estimate to the frequency domain; and
- circuitry configured to select the initial channel estimate or the filtered frequency domain channel estimate.

12. The system of claim 11 wherein the filter is a low pass filter.

13. The system of claim 11 wherein the iFFT block and the FFT block are matched for bit reversal with each other and a FFT block of the receiver which transforms received symbols to the frequency domain.

14. The system of claim 11, wherein the circuitry configured to select the initial channel estimate or the filtered frequency domain channel estimate is a multiplexer.

15. A receiver for a wireless communication system, comprising:
- downconversion circuitry to downconvert received signals to baseband signals;
- an analog to digital converter to digitize the baseband signals;
- a Fast Fourier Transform (FFT) block to transform the digitized signal to the frequency domain; and
- a channel estimate block to provide a channel estimate for use in performing channel compensation on the frequency domain signal, the channel estimate block including circuitry to form an initial channel estimate, an inverse Fast Fourier Transform (iFFT) block to transform the initial channel estimate to the time domain, a filter implementing a digital mask to mask selected samples of the fine domain initial channel estimate, and a further FFT block to transform the masked time domain initial channel estimate to the frequency domain.

16. The receiver of claim 15 wherein the FFT block and the further FFT block are configured to perform an FFT using a decimation in frequency process and the iFFT block is configured to perform an iFFT using a decimation in time process, and the FFT block and the further FFT block are not configured to perform bit reversal of output and the iFFT block is not configured to perform bit reversal of input.

17. The receiver of claim 15 wherein the FFT block and the further FFT block are configured to perform an FFT using a decimation in time process and the iFFT block is configured to perform an iFFT using a decimation in frequency process, and the FFT block and the further FFT block are not configured to perform bit reversal of input and the iFFT block is not configured to perform bit reversal of output.

* * * * *